No. 751,023. PATENTED FEB. 2, 1904.
C. SPIVEY.
FLOOD GATE FOR FENCES CROSSING STREAMS.
APPLICATION FILED OCT. 6, 1903.
NO MODEL.
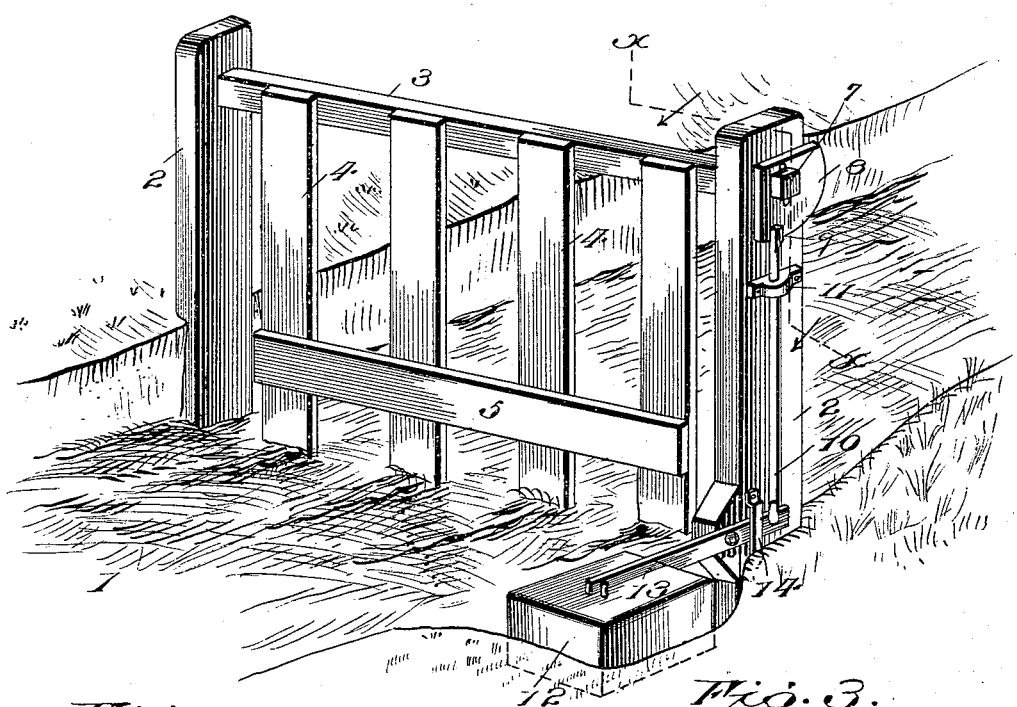
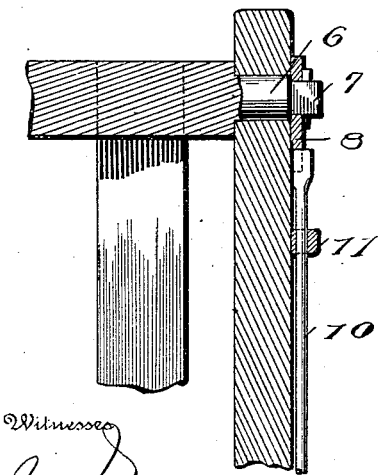
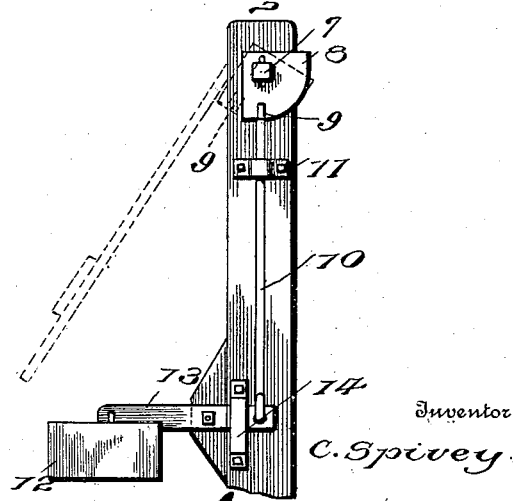
Inventor
C. Spivey No. 751,023. Patented February 2, 1904.

UNITED STATES PATENT OFFICE.

CHARLES SPIVEY, OF SUTTON, NEBRASKA.

FLOOD-GATE FOR FENCES CROSSING STREAMS.

SPECIFICATION forming part of Letters Patent No. 751,023, dated February 2, 1904.

Application filed October 6, 1903. Serial No. 176,019. (No model.)

*To all whom it may concern:*

Be it known that I, CHARLES SPIVEY, a citizen of the United States, residing at Sutton, in the county of Clay and State of Nebraska, have invented certain new and useful Improvements in Flood-Gates for Fences Crossing Streams, of which the following is a specification.

This invention provides an automatically-operable gate to be used for spanning small streams or watercourses and adapted to normally remain closed except when the stream is at flood height, when by operation of certain means provided for the purpose the gate will open sufficient to permit passage of debris or the like carried by the water.

The gate is preferably utilized to form a continuation of a fence which extends in the direction upon opposite sides of the gate, though, as will be obvious, the invention in other adaptations is very serviceable.

For a full desciption of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a gate embodying the invention, showing the same closed. Fig. 2 is a sectional view on the line X X of Fig. 1, portions of the gate structure being broken away. Fig. 3 is a side elevation showing the coöperating device for locking the gate in closed position, the gate when opened being disposed approximately in the position indicated by the dotted lines.

Corresponding and like parts are referred to in the following description and indicated in all the views of the drawings by the same reference characters.

As shown in the drawings, the gate is mounted in a position across the bed of a small stream or watercourse 1, the same being supported by posts 2, located upon opposite sides of the course. The gate is of the hanging type, comprising an uppermost journal-baton 3, vertical bars 4, and lowermost cross-bar 5. The bar 3 is journaled between the supporting-posts 2, the journals being designated 6. The end portion of the bar 3 adjacent one of the journals 6 is extended beyond one of the posts 2 and squared, as shown at 7. Suitably secured to the squared portion 7 of the journal-bar 3 is a segment 8, which is provided upon the peripheral portion thereof with a notch 9. A detent-bar 10 is slidably mounted adjacent the segment 8, being guided in its movement by a bracket 11, projected from the supporting-posts 2, through which the squared portion 7 of the journal-bar 3 extends. The upper portion of the detent-bar 10 coöperates with the segment 8, being adapted to move in and out of the notch 9 upon said segment to lock the gate closed when the stream by which the gate is spanned is at a normal height. As before mentioned, the gate is automatically operable, float means being the actuating medium for accomplishing the above. The float 12 is located adjacent the detent-bar 10, a pivoted arm 13 being secured at its opposite ends to the detent-bar 10 and the float 12, respectively. The arm 13 is pivoted to the supporting-posts 2, and a guide-bracket 14, secured to the side of the post, prevents lateral play of the pivoted arm 13 in a manner which will be seen.

In the operation of the gate the normal position of the same is shown in Fig. 1, the detent-bar 10 having its upper end resting on the notch 9 of the segment 8, thereby locking the gate from movement. During floods it is of course necessary that the gate should be open, since the debris carried by the stream when in flood condition would seriously damage the gate, as will be appreciated. However, flooding of the stream actuates the float 12 upwardly, and this movement of the float likewise causes actuation of the detent-bar 10 to throw the same out of engagement with the notch-segment 8, thereby permitting a pivotal movement of the gate outwardly and upwardly which admits of the passage of the obstruction passing down the watercourse.

The gate is extremely simple both as to operation and to structure and for this reason very desirable.

Having thus described the invention, what is claimed as new is—

1. The combination with suitable supports, a swinging flood-gate mounted between the said supports and having one of its journals extending beyond one of the supports, a notched segment mounted upon the aforesaid journal and actuated thereby, and a float-actuated detent-bar for engagement with the notched portion of the segment to lock the gate closed and permitting automatic opening thereof.

2. The combination with supporting-posts, a flood-gate mounted between the said supporting-posts and having one of its journals extended beyond one of the supporting-posts and squared, a notched segment secured to the squared portion of the aforesaid journal, a detent-bar mounted upon the post adjacent the segment for coöperation with the notched portion of the segment, a float disposed adjacent the detent-bar for actuation thereof, and a pivoted arm connected at opposite ends to the float and detent-bar respectively.

In testimony whereof I affix my signature in presence of two witnesses.

CHARLES SPIVEY. [L. S.]

Witnesses:
E. E. YOCUM,
E. P. BURNETT.